(12) United States Patent
Peters et al.

(10) Patent No.: US 8,918,819 B1
(45) Date of Patent: Dec. 23, 2014

(54) AUTOMATED REMOTE COLLABORATIVE LEARNING SOFTWARE

(71) Applicant: University of Central Florida Research Foundation, Inc., Orlando, FL (US)

(72) Inventors: Philip Peters, Winter Park, FL (US); Alex Katsaros, Winter Park, FL (US); Henry Adam Lenz, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 14/160,114

(22) Filed: Jan. 21, 2014

Related U.S. Application Data

(60) Provisional application No. 61/754,779, filed on Jan. 21, 2013.

(51) Int. Cl.
 *H04N 21/238* (2011.01)
 *H04N 21/433* (2011.01)
 *H04N 21/2385* (2011.01)

(52) U.S. Cl.
 CPC ....... *H04N 21/4334* (2013.01); *H04N 21/2385* (2013.01)
 USPC .......................................... 725/78; 725/139

(58) Field of Classification Search
 USPC ........................................................ 725/78
 See application file for complete search history.

(56) References Cited

U.S. PATENT DOCUMENTS

| 8,650,489 B1 * | 2/2014 | Baum et al. ................... 715/723 |
| 2009/0249409 A1 * | 10/2009 | Bhogal et al. ................... 725/86 |

* cited by examiner

*Primary Examiner* — Jefferey Harold
*Assistant Examiner* — Justin Sanders
(74) *Attorney, Agent, or Firm* — Andriy Lytvyn; Smith & Hopen, P.A.

(57) ABSTRACT

A method and system of automated remote collaborative learning broadcasting. A computer-based server receives a plurality of video feeds for a remote interaction. Server receives unique user identifier and bandwidth of unique user viewing a remote interaction. Unique user is identified based upon bandwidth connection as either active or passive. Local audience viewers receive the plurality of video feeds and may select a video feed among the plurality of video feeds. Local audience viewers may seamlessly switch between the plurality of video feeds based upon individual preference. Server tracks local audience viewer's video feed selection. Remote audience viewers receive single video feed determined by local audience viewer selection. Minimum video switching time must be met before switching single video feed to a new view. Video threshold automatically switches video feed based upon prolonged static view if predetermined criteria is met.

15 Claims, 8 Drawing Sheets

AUTOMATED REMOTE COLLABORATIVE LEARNING SOFTWARE

RELATED APPLICATIONS

This application is a non-provisional of U.S. Provisional Patent Application No. 61/754,779, entitled "AUTOMATED REMOTE COLLABORATIVE LEARNING SOFTWARE," filed Jan. 21, 2013, the entire disclosure of which is incorporated by reference herein in its entirety.

BACKGROUND OF THE INVENTION

1. Field of the Invention

This invention relates to distributed learning and collaborative interaction through video. More specifically, it relates to manual and automated selective viewing of long distance learning and interaction based upon viewer selection and bandwidth.

2. Brief Description of the Related Art

Remote collaboration technologies focus on delivering interactions to individuals and groups that are not in physical proximity to other participants. Advances in technology have allowed remote collaboration to quickly expand and grow in the academic and corporate environments. Although remote collaboration technologies are increasingly used in both academic and corporate environments, many questions remain regarding their efficacy in the realm of knowledge/skills transfer.

Studies have shown that live events carry with them a more acute sense of relevance and emotional engagement that are likely to increase participant attentiveness and engagement (Jarvelainen, J., Schurmann, M., Avikainen, S. & Hari, R. (2001). "Stronger reactivity of the human cortex during observation of live rather than video motor act." *NeuroReport*, 12, 16, 3493-3495). In fact, there is considerable data illustrating "presence" and "immediacy" as essential elements for success in traditional online and large group face-to-face interactions (Gunawardena, C. N., & Zittle, F. J. (1997). Social presence as a predictor of satisfaction with a computer-mediated conferencing environment. *American Journal of Distance Education*, 11, 8-26; Robert, K. and Lenz, A. (2009), Cowboys with cameras: an interactive expedition. *British Journal of Educational Technology*, 40: 119-134).

Presently, many remote video interactions present the user with a static view of the interaction they are viewing. Viewers are limited to a single viewing lens chosen by someone other than the viewer, usually editors and video crews. This results in a very limited feeling of presence and immediacy throughout the interaction. There exists a need for a system and method that allows viewers to select specific views. Such a system should allow a more dynamic interaction, foster a learner-centered environment where students have more personalized control, and remove costs associated with video editing. Additionally, the system should be adaptable so that individuals with low bandwidth are able to still receive a more dynamic experience.

However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need for an automated collaborative learning software, which allows for automated selective viewing of a video feed based upon viewer selection and bandwidth is now met by a new, useful, and nonobvious invention.

In an embodiment of the invention, a computer-based server receives a plurality of video feeds for a single remote interaction. The server determines whether the end viewer has a high or a low bandwidth. The users with high bandwidth are classified as local audience viewers, while the users with low bandwidth are classified as remote audience viewers based on upon predetermined bandwidth criteria. Responsive to the end user identified as the local audience viewer, the server sends a plurality of video feeds to the end user. The user then selects a single video feed that he finds most pertinent. The system determines the single most selected video feed based on the video feed selection from the plurality of local audience viewers. Only the most selected video feed is sent to the remote audience viewers due to their bandwidth limitations. The most selected video is dynamically updated as the local audience viewers select different video feeds.

In an embodiment, the computer-based server determines whether the predetermined time limit has been reached prior to sending the new most selected video feed. The video feed selections may be recorded and associated with a specific user based upon the user's unique identifier.

In an embodiment of the invention, a pertinence score reflective of the video feed's pertinence may be assigned to each video feed. The pertinence score may be based on the percentage of local audience viewers that have currently selected the video. The pertinence score may further be a function of the local audience viewers' comprehension scores, where the user's video feed selection is weighted based on their comprehension scores. The comprehensions scores may be based on a predetermined performance criteria including a frequency of changing the video feed selection, a number of correctly answered quiz questions, a number of characters entered as notes, a duration of inactivity, and combinations thereof. In an embodiment of the invention, a real-time average comprehension score for all viewers may be calculated and provided to the system administrator.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention includes a computer implemented method and system to allow viewers of a remote collaboration to select how they are viewing the interaction from a plurality of video feeds. Viewers are able to seamlessly switch between the plurality of video feeds based upon the specific viewer preferences. Present invention includes an option for viewers with lower bandwidth to view the invention in a more dynamic manner than offered through traditional passive viewing. In fact, one of the novel features of the present invention is distinguishing between viewers with high bandwidth and viewers with lower bandwidth.

Local area network, or LAN, is a computer network that centers on a limited area, such as a school, office building, or home. LAN networks on a typical local switch can achieve 10 mb/s-10 gb/s of bandwidth. Wide Area Network, or WAN, is a network that covers a much broader area. As a result, WAN networks generally achieve less bandwidth than LAN networks and attempting to achieve similar bandwidth can be extremely costly. In a remote interaction setting, this prevents remote viewers from being able to simultaneously switch between a plurality of video feeds, thus leaving low bandwidth viewers with a stationary interaction. A goal of the present invention is to engage low bandwidth users in a remote interaction that offers a more in-person, real-time experience while working within the bandwidth constraints.

This becomes particularly important over interactions that involve satellite communication. It is exceedingly difficult to achieve high bandwidth through satellite communication, especially when multiple video feeds are involved. Transmitting a single video feed is important to maintain video quality, especially if the video is being transmitted in real time. There exists a need for an invention that allows for real-time video feed via satellite connection without sacrificing the in-person interaction.

Figure 1:
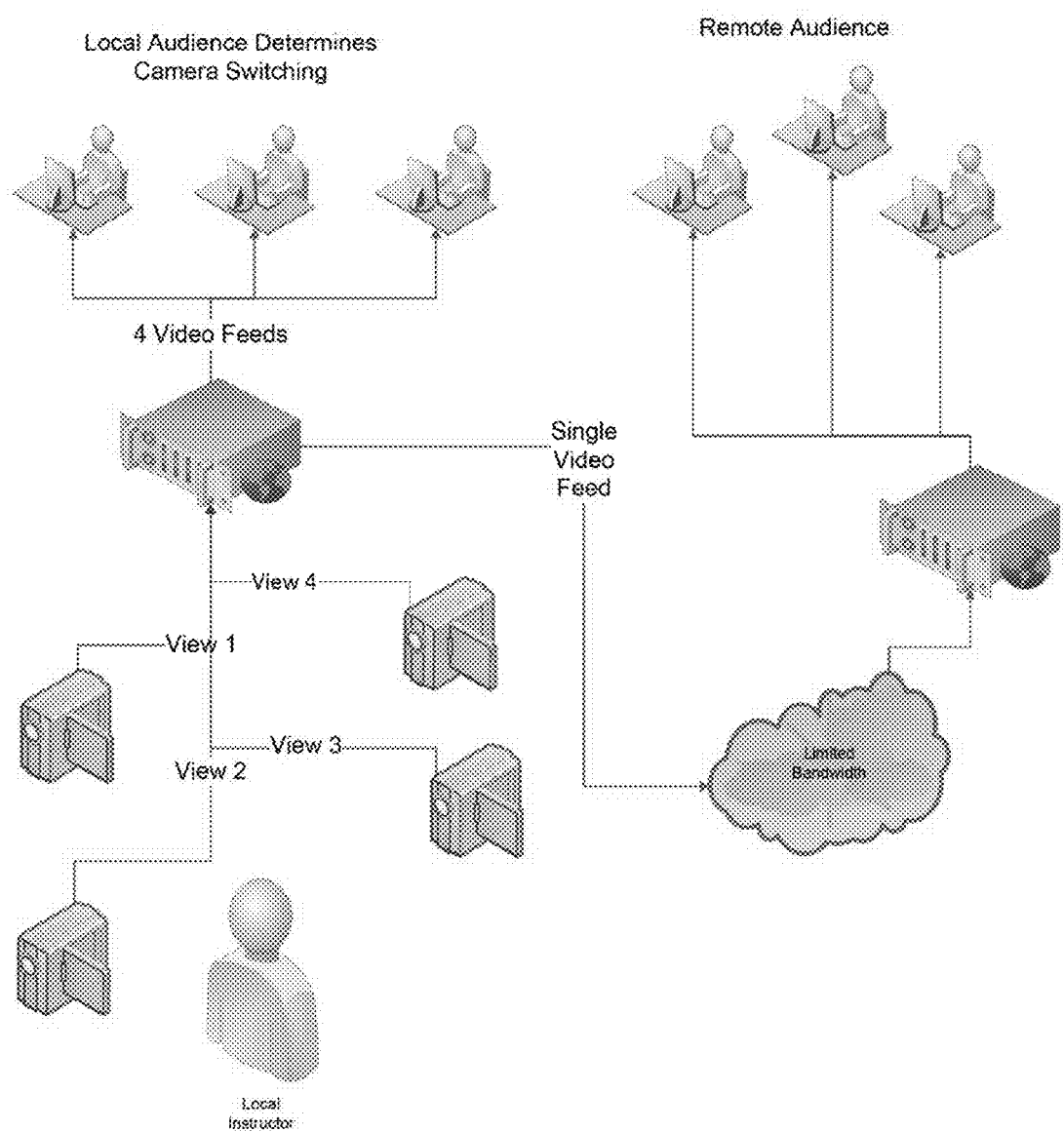
FIG. 1 is an illustration of the remote interaction functional relationships between instructor, local audience and remote audience in accordance with a preferred embodiment of the present invention.

With reference to FIG. 1, the novel invention includes a plurality of video feeds connected to a computer-based server. Throughout the detailed description, reference will be made to FIGS. 2, 3, and 4, which illustrate graphical user interfaces in accordance with a preferred embodiment of the present invention. Plurality of video feeds each record a unique view of a remote instructor. Reference is made to remote instructor as representative of the subject(s) of the video feeds. It is foreseeable that the remote instructor may include live remote video and pre-recorded video, including videos for entertainment, education, or collaboration. Additionally, the remote instructor may include different subject matter relating to the overall remote collaboration.

Figure 2:
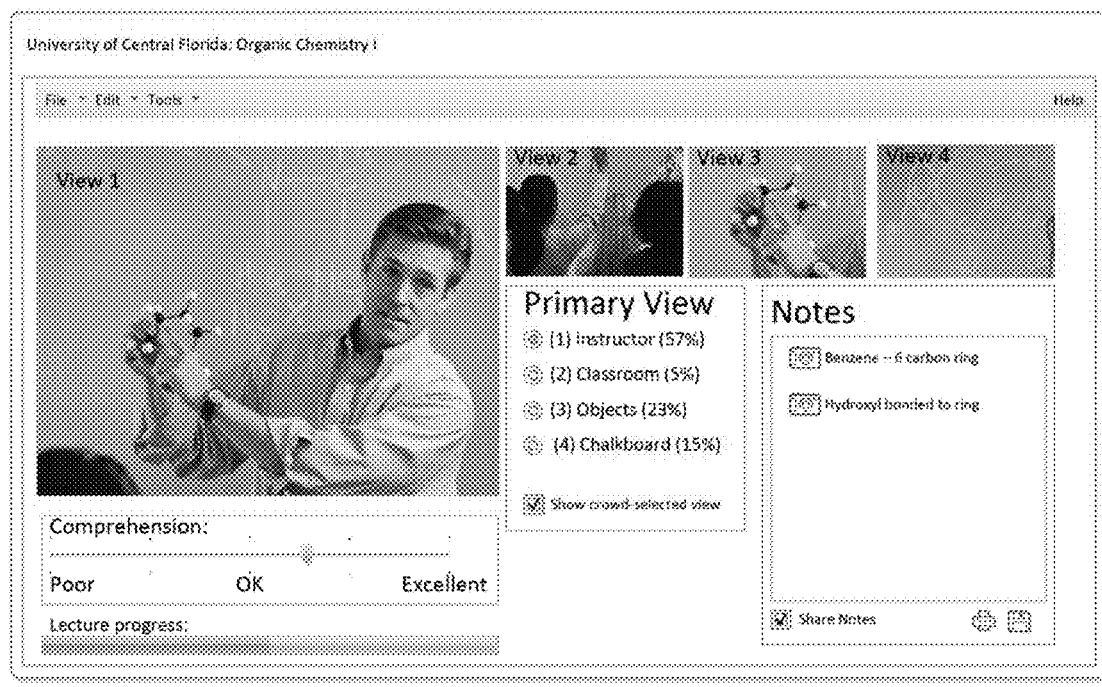
FIG. 2 is a graphical user interface screen capture in accordance with a preferred embodiment of the present invention showing what a local audience viewer would see.
Figure 3:
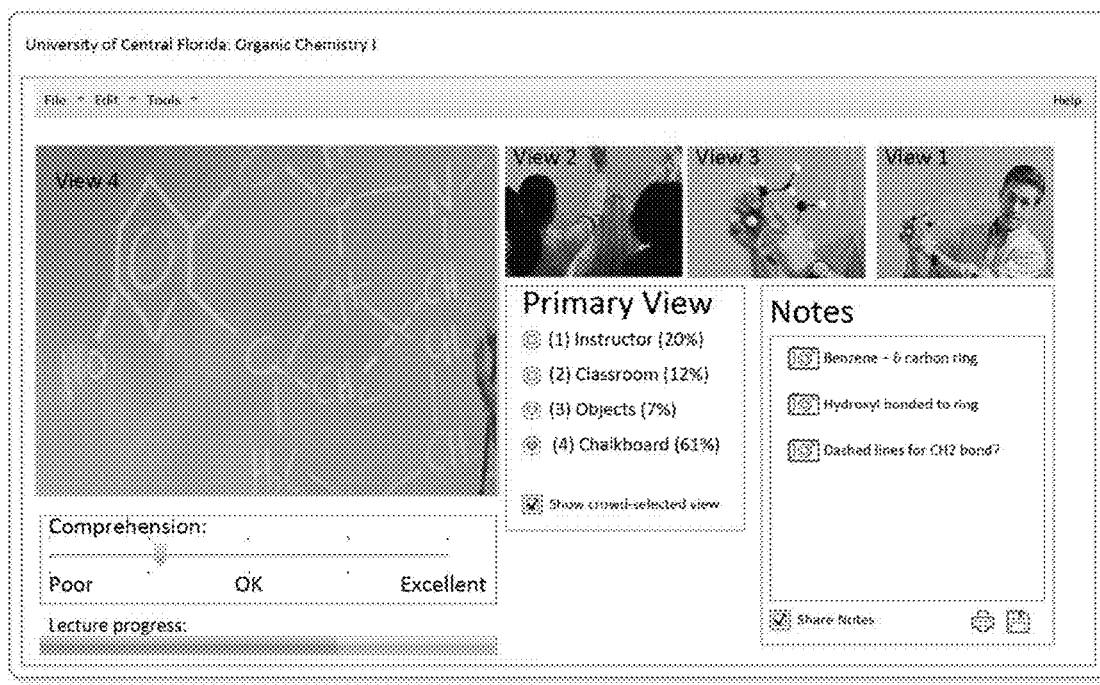
FIG. 3 is a graphical user interface screen capture in accordance with a preferred embodiment of the present invention showing what a local audience viewer would see.
Figure 4:
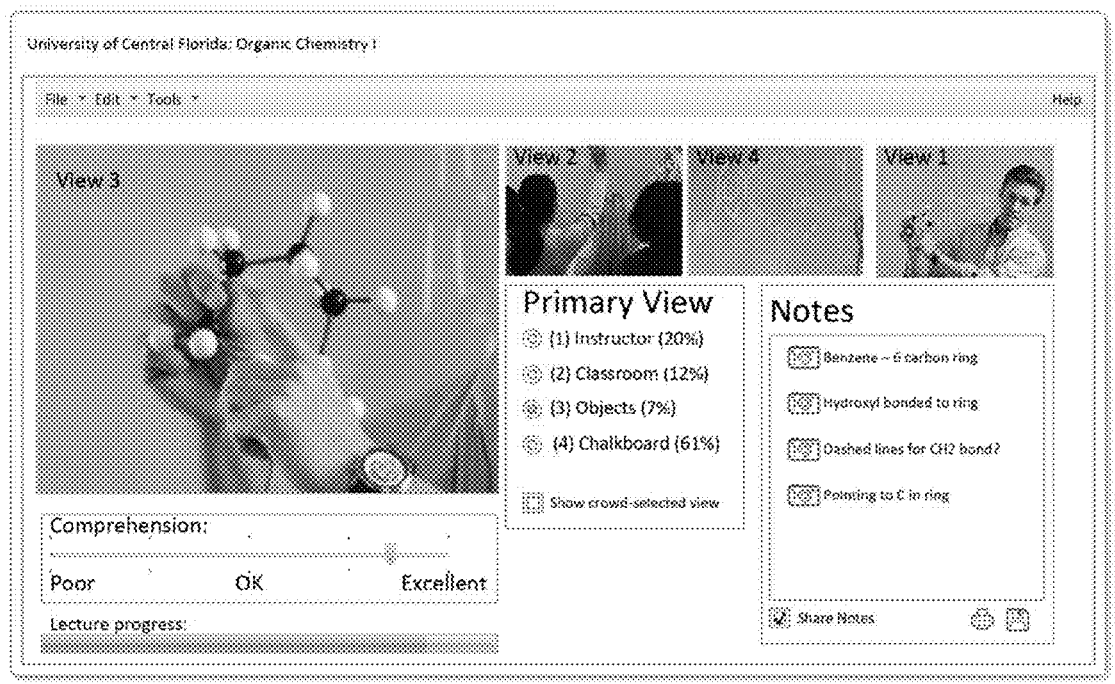
FIG. 4 is a graphical user interface screen capture in accordance with a preferred embodiment of the present invention showing what an local audience viewer would see.

For example, in an instructional setting the plurality of video feeds may relate to separate portions of an instruction. With reference to FIGS. 2-4 one feed may be a close-up view of an instructor. Another video feed may be a close-up of the subject matter of the instruction. Additional video feeds may focus on a blackboard or students for demonstrative purposes.

Each video feed is sent to a computer-based server where a plurality of remote viewers have access to the server.

A novel feature of the present invention includes a unique way viewers can interact with the video feeds through the computer-based server. In a preferred embodiment, the server automatically determines bandwidth of connected viewers and categorizes them according to high bandwidth and low bandwidth connectivity. In an alternative embodiment, viewers may select which bandwidth option they wish to view the video feed. Whether automatically or manually selected, viewers are identified by the server as either local audience, for those with high bandwidth, or remote audience, for those with low bandwidth. It is important to note the terms local and remote should not be viewed as geographically limiting. While one embodiment of the present invention may separate viewers based upon having a local geographic location, i.e. physically present for the interaction or in close physical proximity to other viewers, a preferred embodiment of the present invention separates users based solely upon bandwidth connection. Separating viewers based solely upon bandwidth connection does not necessitate a geographical physical component. Local may refer to viewers that share the same high-bandwidth network, but not the same physical location. It is also foreseeable that defining viewers as "local" or "remote" may be based upon a combination of criteria that may include, but is not limited to, geographic presence, bandwidth connection, computer specifications, and user identification.

Local audience viewers select a video feed among the plurality of video feeds throughout the interaction. It is foreseeable that local audience viewers may select the video feeds through keyboard shortcuts, such as numerical keys, or through mouse interaction. With reference to FIGS. 2, 3 and 4 as illustrative examples, the local viewer has the option to select among a plurality of video feeds. The view selected by the local audience viewer is larger or highlighted in relation to the various other video feeds. For example, in FIG. 2 the local viewer has selected a view of the instructor (view 1) to be the present focus.

Other video feeds, in FIG. 2 views 2-4, are minimized in relation to the selected video feed. In a preferred embodiment, the non-selected video feeds continue to play in real-time along with the selected video. In an alternative embodiment, the non-selected videos may show a description or fixed screen shot until selected. Upon being selected the newly selected video becomes the new focus.

A local audience viewer may select a video feed focusing on the instructor while the instructor is speaking and switch to another video feed when the student needs to reference a difference video feed. For example, in FIG. 3 the local audience viewer has selected a close up of view 4. However, in FIG. 4 the local audience viewer has decided to switch to view 3 in order to get a better understanding of the subject matter. This provides the local audience viewers with the option to seamlessly switch between focus points throughout the remote collaboration. Using miniature or thumbnail videos for the non-selected views allows the local audience viewer to keep track of the other views so that the local audience viewer can change primary selected view seamlessly. The availability of local audience viewers to switch between video feeds and focus points allows viewers to engage in the interaction as though they are present where the event is being viewed. Throughout the remote collaboration session the computer-based server tracks each local audience viewer's selected video feed. This tracking is updated live as the local audience viewers change between video feeds. This tracking is also displayed on the Instructor Tablet application's network management console to provide the instructor with updated analytics from the server.

In a preferred embodiment, the tracking of selected video feeds is displayed by the computer-based server in real-time to local audience viewers. FIG. 2 depicts how this information is utilized in accordance with a preferred embodiment of the present invention. A "primary view" box illustrates the different view selections with a real-time feedback of which views other local audience viewers are selecting. For example, FIG. 2 illustrates that fifty-seven percent (57%) of local audience viewers have selected instructor view as the present focus. In addition, FIG. 2 also indicates that the present local audience viewer is also viewing the instructor video feed. While the present illustration depicts the viewing feature as a separate box, it should be understood that this is meant to be illustrative rather than limiting of how the feature may be incorporated. For example, the percent of local viewers may be indicated below each video feed or in a task bar display.

Another novel feature of the real-time video feed selection tracking is the ability of the computer-based server to automatically select the video feed that is the most selected feed by local audience viewers. This embodiment of the present invention is exemplified through FIGS. 2 and 3. In FIG. 2, the local audience viewer has selected "show crowd-selected view" feature. When this feature is selected, the computer-based server automatically selects the most popular video feed that the majority of local audience viewers are presently watching. With reference to FIG. 2, the majority of local audience viewers are watching the instructor video feed, as indicated by fifty-seven percent (57%), thus the focus of the local audience viewer who selected the crowd-selected feature is viewing an instructor. The selected video feed changes as the majority of local audience viewers change video feeds. As shown in FIG. 3, the majority of local audience viewers have changed to view the chalkboard video feed. As a result, the representative graphical user interface display has changed to chalkboard video feed as the primary video feed. It is important to reiterate that while a local audience viewer may select the "crowd-select" view, they may decide to select a different view. This is illustrated on the graphical user interface in FIG. 4. In FIG. 4, the local audience member has selected a different video feed (the objects) from the majority of local audience viewers (the chalkboard). This creates a highly customizable experience for each participant in the local audience.

In a preferred embodiment, the server tracks each individual local audience member through a unique user identification. For example, a local audience member may be tracked by a unique PIN number, user identification number, or other identifying information. The server tracks the uniquely identified viewer's video feed selections and saves each of the viewing choices. Each unique user may later retrieve their individualized interaction as determined by video feed selections. Server also saves the selected video feeds for the majority of local audience viewers.

An additional novel aspect of the present invention is the inclusion of a comprehension rating system that tracks user comprehension throughout the remote interaction. Comprehension may be tested through any number of pre-determined criteria, such as periodic quizzes, average time a viewer spends on a particular view, and average time viewer's graphical user interface goes without any user interaction. For example, if quizzes are used, the video may pause for a specified period of time while each viewer is presented with a series of questions. Viewer comprehension is based upon the number of correct answers. Alternatively, live questions may be asked and viewers respond to the questions through a note, chat, or video exchange features. An instructor or third party may then determine which viewers have correctly answered the question. Server tracks the user performance based on the number of correctly answered questions and rates comprehension accordingly.

FIGS. 2-4 illustrate how the comprehension meter may change throughout a remote interaction. In FIG. 2 the viewer is having an average comprehension of the material. However, as shown in FIG. 3, the viewer's comprehension has decreased with the current subject matter. Finally, FIG. 4 illustrates a user who has a very solid understanding of the material.

The addition of a comprehension meter allows for several novel embodiments of the present invention. In one embodiment, the server tracks a viewer's comprehension throughout the remote interaction. Server will then allocate points based upon a viewer's comprehension. The point system is used to determine what the "crowd-selected" view will be. For example, a viewer that has a relatively high comprehension will be afforded more weight in determining the "crowd-selected" view over a viewer that has a relatively low comprehension. Server shifts allocation of "crowd-selected" view weight as viewer's increase or decrease in comprehension during the remote interaction.

In another embodiment, the tracking meter may be used to determine particular sections of the remote interaction viewers are having trouble with. After identifying a problematic section of the lecture, the server may highlight that section when viewer is re-watching the material. Additionally, for pre-recorded remote interactions, users may be able to progress through the remote interaction based upon their comprehension. In this embodiment, the entirety of the remote interaction is recorded and separated into a variety of viewing tracks. For example, pre-recorded remote interaction may be separated into three different viewing tracks, where the three tracks increase in the amount of time that is spent on a particular subject matter. As a viewer progresses through the interaction, the viewing track they are on changes based upon comprehension. Thus, the pre-recorded lecture varies in length and structure depending on individual viewer comprehension.

Another key feature of the comprehension tracking is the ability for the instructor to track the overall performance of the class and individual performance of each user. The comprehension data is saved to the server and is retrievable by the instructor. This is useful in assisting the instructor, or a third party, in determining which viewers may require additional instruction, or which portions of the remote interaction were unclear. In a live remote interaction, instructor may receive real-time feedback of particular areas where viewer comprehension as a whole has fallen below average. This feedback is displayed on the Instructor Tablet application's viewer comprehension console to provide the instructor with updated analytics from the server. Instructor may then decide to adjust live remote interaction to address the falling comprehension.

In a preferred embodiment of the present invention, a real time chat or note feature may be included. Real time note feature allows viewers to post comments, ask questions via video exchanges, or share notes with other viewers. Viewers are individually identified based upon their unique identifier so that notes are appropriately tracked.

Remote audience viewers receive a single video feed from the computer-based server based upon video feeds selected by local audience viewers. In a preferred embodiment, Remote audience viewers view the highest selected video feed among local audience viewers (crowd-selected view). For example, if the majority of local audience viewers are viewing the instructor video feed, as illustrated in FIG. 2, a remote audience viewer will also view the subject matter video feed. When the majority of local audience viewers change to a different viewing feed, the remote audience viewers will change to the new majority video feed. In an alternative embodiment, remote audience viewers may select a particular local audience viewer to "follow." In this embodiment, the remote audience viewer sees the same video feeds that the local audience viewer has selected as their primary choice.

It is foreseeable that an embodiment of the present invention includes pre-determined compilations of video feeds. In this embodiment, remote audience viewers select a particular pre-determined compilation based upon viewing preferences. For example, a remote audience viewer may select to view a series of video feeds that focus on a particular view or more heavily focus on a specific subject matter. In an alternative embodiment, remote audience viewers receive a fully transmitted view of the preferred video feed among local audience viewers and limited or restricted transmission of the non-preferred video feeds. It is foreseeable that remote audience viewers receive some or all of the features available to local audience viewers.

Figure 5:
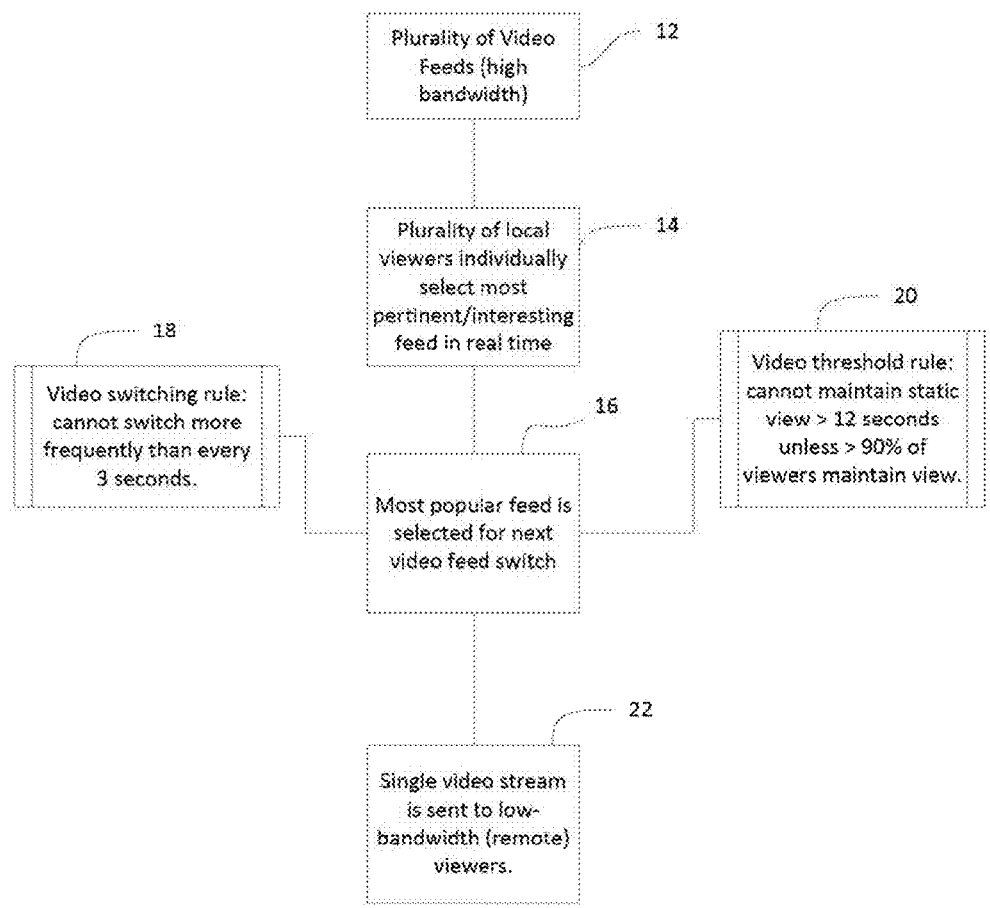
FIG. 5 is a flowchart of the method used to provide automated distributed learning broadcasting in accordance with a preferred embodiment of the present in invention.

The method, which is illustrated in the flowchart of FIG. 5, includes receiving a plurality of video feeds to a computer-based server 12. Computer-based server receives a unique user identifier and bandwidth of the identified user. In a preferred embodiment, computer-based server identifies a threshold bandwidth. Users below the threshold bandwidth are identified as having low bandwidth. Users above the threshold bandwidth are identified as having high bandwidth. In an alternative embodiment, server receives manual user selection of high bandwidth or low bandwidth and identifies user accordingly.

Users with high bandwidth, identified as local audience viewers, may choose between the plurality of video feeds 14. Computer-based server receives requested video feeds from uniquely identified active users. Local audience viewers then receive selected video feed content on user's graphical user interface. Server tracks the particular video feeds selected by each local audience viewer. The server determines which video feed is the most popular video feed among local audience viewers 16. Based upon a determination of most popular video feed, server selects most popular video feed for next video switch based upon predetermined rules.

First, the server is restricted on how often it is allowed to switch between video feeds 18. This prevents the subject video feed from switching in such a rapid succession that it is difficult to decipher and understand. For example, the server has a pre-set condition that it will not switch more than every three (3) seconds. This means that remote audience viewers and local audience viewers that have selected the "crowd-selected" view must stay on a particular screen shot for at least three (3) seconds before switching video feeds regardless of the most popular video feed during that period of time.

Second, the server is restricted on how long a particular video feed can remain static in step 20. Static guidelines are determined based upon a pre-determined amount of time. For example, a twelve (12) second threshold may be placed on each video feed, such that a viewer will automatically move to a new video feed at the end of the time period. Preference to what video feed to switch to can be determined by a variety of factors, including the next most selected video feed, which video feed has the highest comprehension, an instructor or third party selected feed, etc. It is noted that there may be times when a selected view may be particularly useful beyond the video time threshold. To remedy this situation the preferred embodiment of the present invention includes an exception when a particularly large percentage of local audience viewers have selected a particular video feed. For example, a single view may stay active beyond the video feed threshold if greater than ninety percent (90%) of active audience viewers maintain the selected view. Other embodiments may include exceptions based upon a pre-determined comprehension threshold, instructor exemption instruction, third party exemption instruction, or viewer exemption instruction. Also, the tablet application (RICT) may be used as a method for instructors to manage network viewing options that determine when exceptions will be enabled. Based upon all of the foregoing criteria a single video stream is sent to remote audience viewers in step 22.

Figure 6:
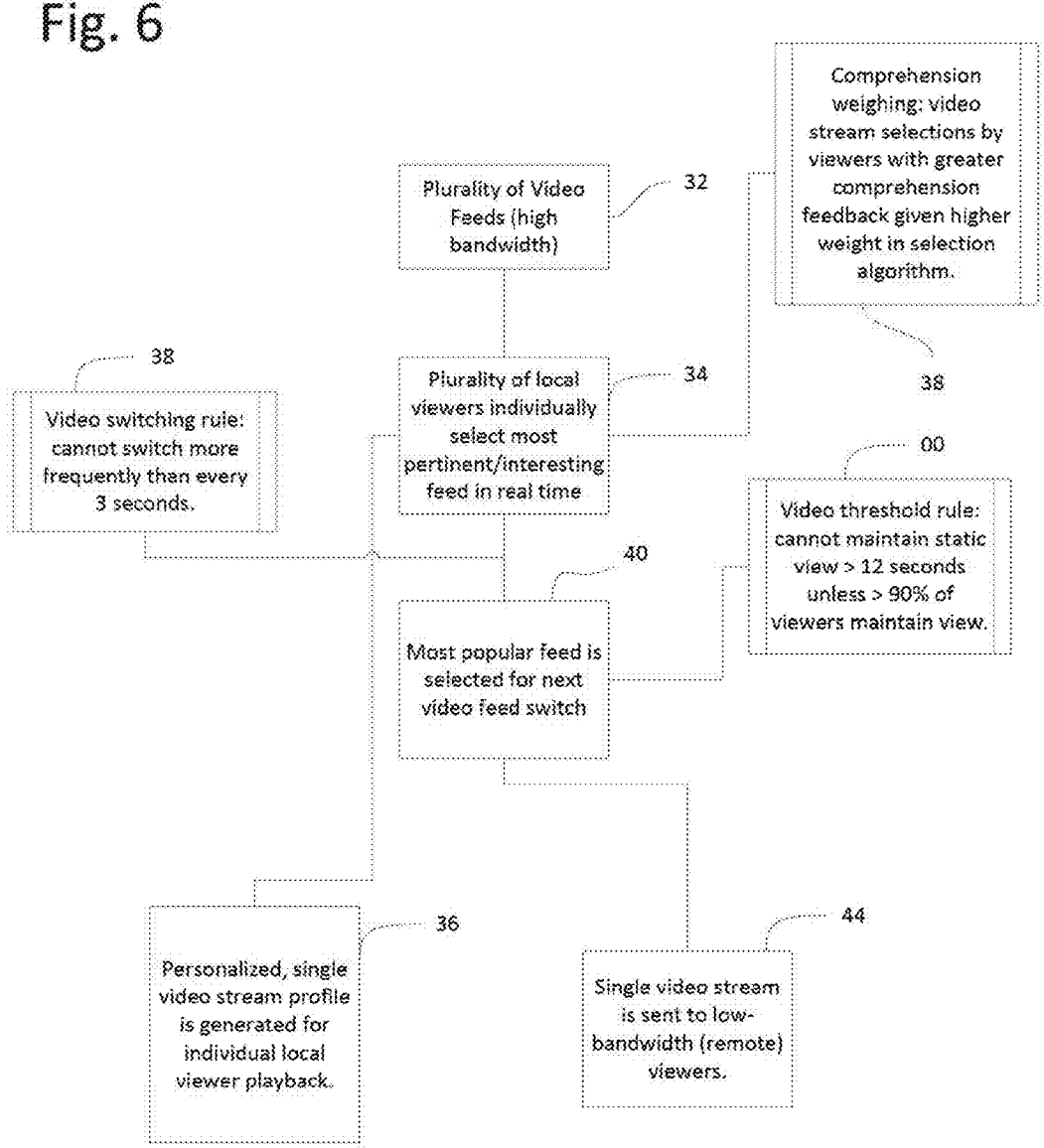
FIG. 6 is a flowchart of the method used to provide automated distance learning broadcasting in accordance with a preferred embodiment of the present in invention.

FIG. 6 depicts another flow chart showing the steps of a preferred embodiment of the present invention. A computer-based server receives a plurality of video feeds 32. Plurality of local audience viewers determine which video feeds are most pertinent/interesting in real time based upon viewer selection 34. Server keeps track of individual local audience viewing selection and generates an individual playback customized to the unique local audience viewer based upon selection 36. Server accounts for comprehension weighing when determining which videos the plurality of local audience viewers find most pertinent/interesting 38. The greater the comprehension rating of the local audience viewer, the greater weight they are given to the most pertinent/interesting video feed. Server then determines whether a video switching minimum threshold has been met, in this case three (3) seconds between the last video switch 38. If the video switching minimum threshold has been met, the server will proceed to selecting the most popular feed for next video switch 40. If the video switching minimum has not been met, the server will not select the next video for switch.

Next, the server will determine whether a static video feed has been maintained for a prolonged period of time in step 42. In this embodiment, the threshold is twelve (12) seconds before the server must switch to a new feed. However, the server will provide an exception if certain criteria is met. For example, if ninety percent (90%) of local audience viewers have maintained the view, the video feed will not change. If both the video switching condition 38 and the video threshold maximum 42 are satisfied, then the server will proceed with switching the video feed. The selected video feed is sent to remote audience viewers via low bandwidth for viewing 44. It is important to note that while remote audience viewers receive a single video feed based upon local audience users, a remote viewer may still view the interaction live. The video feed through which they view the remote interaction is determined by a variety of pre-set criteria, but a remote user may still interact in real time through chat and video exchanges and perform other activities that local audience viewers are able to use.

Throughout the interaction, the server records the choices made by local audience viewers. The recording is associated with the unique local audience member ID. Recording may be accessed at a later time by local audience viewer for a personalized video. Server may also record the selected video feeds based upon the "crowd selected" view or local audience viewers with the highest comprehension. These recordings may be accessed by remote audience viewers for later playback.

In a preferred embodiment or the present invention, each video feed is given a time code. Time codes are used in video production and filmmaking for synchronization and logging of recorded material. Synchronizing among the plurality of video feeds allows for each separate video feed to be able to play back in appropriate sequence. This becomes especially important for recorded remote interactions. Using time codes, the various feeds are able to play back simultaneously, thus allowing a user to switch between the various video feeds without missing segments of the interaction.

An additional embodiment of the present invention allows for allocation of network bandwidth depending on local audience viewer selection. For example, when the server determines a particular video feed is selected by the majority of local audience viewers it will give priority bandwidth to the selected video feed. Non-priority video feeds receive less priority for bandwidth. When the server receives an indication the majority of local audience viewers selected video feed has changed, priority bandwidth changes to new selected video feed.

In another embodiment the system includes a Remote Interaction Control Tablet. RICT is a key component of the overall end-to-end network architecture, which extends the learning environment by allowing mobile collaboration and training management from the field. With guidance from educational case studies and related market requirements, the RICT technology provides a facilitation tool for live training via the internet to classrooms or individuals world-wide. Using multiple cameras and broadcast-style video-mixing, students receive "on location training" and can provide instant feedback via chat and live video exchanges. The use of a tablet feature allows for even more remote interactions. Users may move around while engaging in the remote interaction.

This embodiment of the present invention is especially useful for collaborative interactions occurring in real time that require the viewer to move around and engage in various tasks. For example, in "on the job" training scenarios participants must be able to engage with an activity while interacting with the instructor. When the present invention is combined with a RICT, the viewer is able to receive an in person interaction over a remote connection. RICT also allows the viewer to move around and interact with the subject of the training. An addition of real-time text chat and video exchanges allows the user to gain even more in-person experiences not previously possible with remote interactions.

The RICT application performs the following function while operating on the live collaborative network.
  Monitor inbound/outbound media feeds
  Monitor and Trigger inbound video/voice communications
  Conduct private back-channel communications
  Deploy polls/surveys and Monitor real-time responses & chatrooms
  Manipulate and Monitor custom software functions (GPS Location, Bandwidth, Media Stream Quality, User Metrics, Weather Gadgets, etc.)
  Manage Secure, Encrypted Communications The items below represent many of the "collaborative education" scenarios and use cases that users can enact and facilitate via the RICT:
  Listen to lectures
  Conduct surveys
  Read journal articles or textbooks
  Watch film or slide show
  Complete handouts/worksheets
  Attend guest lecture
  Conduct observations
  Handle manipulatives
  Conduct experiments
  Complete individual or group project
  Writing reflective papers
  Interact with laserdisc program
  Participate in class discussion
  Analyze current events
  Develop and analyze case studies
  Generate and manipulate a database
  Interview others
  Participate in a debate
  Visit community resource centers
  Participate in a panel discussion
  Conduct library research
  Interact with computer simulation
  Visit places of interest
  Manipulate a spreadsheet
  Participate in Q&A sessions
  Make oral/graphic presentation
  Watch demonstrations
  Write paper
  Examine and/or assess other work
  Interact with learning software (i.e. UCF Web Courses LMS)

The RICT or "Instructor's Tablet" is the centerpiece of the network, which allows for learning management from the field in a novel way when compared to the traditional classroom environment. Using the tablet together with multiple cameras and broadcast-style video-mixing, students receive relevant and authentic "on location training" and can provide instant feedback via chat and live video exchanges with the instructor.

Figure 7:
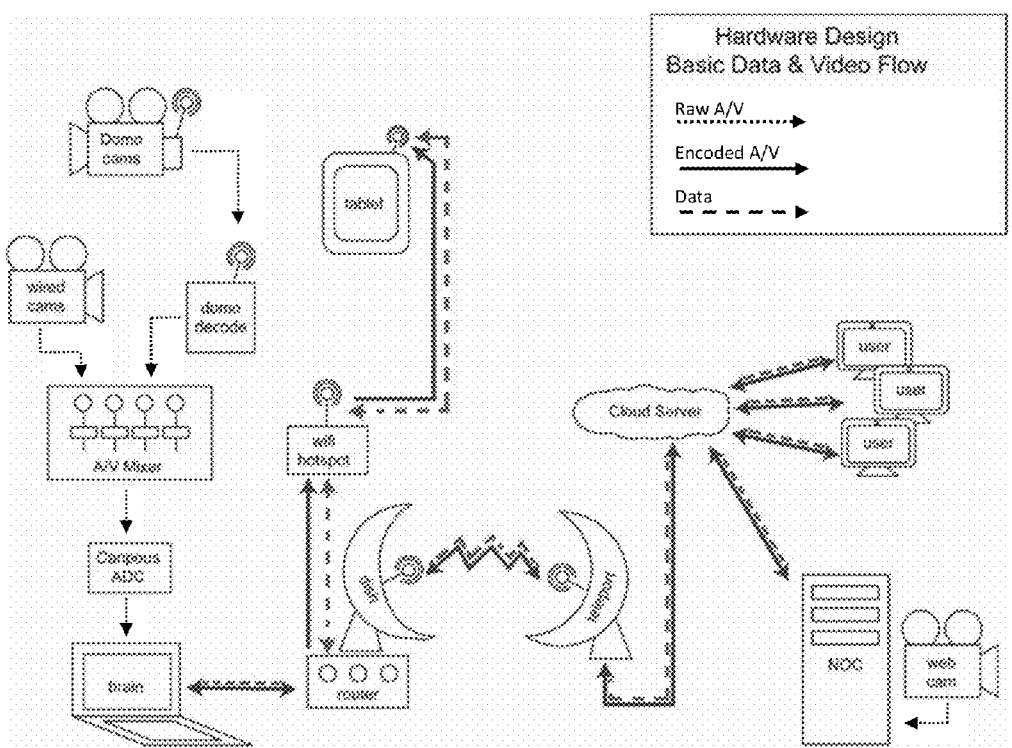
FIG. 7. is a flowchart of the hardware design for basic data and video flow in accordance with a preferred embodiment of the present invention.

FIG. 7 illustrates a preferred embodiment of the hardware design for basic data and video flow in accordance with a preferred embodiment of the present invention. The Production Hub is representative of the computer-based server that received the plurality of video feeds and determines local audience viewers and remote audience viewers. Tablet is representative of the RICT.

Figure 8:
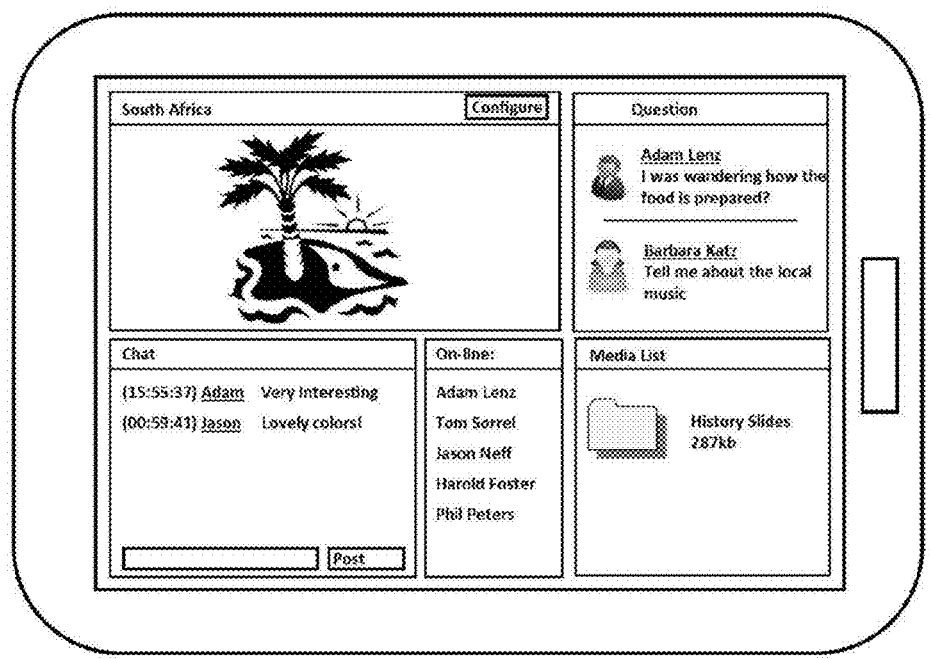
FIG. 8 is an illustration of the RICT in accordance with a preferred embodiment of the present invention.

FIG. 8 is an illustration of the RICT in accordance with a preferred embodiment of the present invention. In the figure, the "crowd selected" video feed is prominently displayed for remote audience viewer reference. A chat feature located below the "crowd selected" video feed allows the user to instantly communicate with other audience viewers. To the right of the video are uploaded questions/comments for the remote instructor. Finally, the bottom right box illustrates media and documents that can be accessed for viewing.

Live events carry with them a more acute sense of relevance and emotional engagement that facilitate an increased interest and student engagement. Using the Remote Instruction Control Tablet (RICT), users can extend their learning environment by mobilizing embedded real-time training tools and controlling multiple wireless cameras during an event. Collaborators can engage with the learner through widget-based "Online portals" of interaction that comprise the overall visual interface metaphor.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program PIN embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program PIN embodied on a computer readable medium may be transmitted using any appropriate medium, including but not limited to wireless, wire-line, optical fiber cable, radio frequency, etc., or any suitable combination of the foregoing. Computer program PIN for carrying out operations for aspects of the present invention may be written in any combination of one or more programming languages, including an object oriented programming language such as Java, C#, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

GLOSSARY OF CLAIM TERMS

Activating: to make something active or operative.

Bandwidth: used to refer to various bit-rate measurements representative of available or consumed data communication resources. This is usually expressed as bits per second.

Comprehension score: a value associated with each end user reflecting the end user's performance. The comprehension score may be based on how often the user changes the video feed selection, the amount of notes user enters, the user's answers to quiz questions that may appear throughout the lecture. The comprehension score is dynamic and changes to reflect user's performance throughout a lecture.

Computer-based server: a computer hardware system dedicated to running one or more services. Services can vary from database server, file server, mail server, print server, web server, or various other types services achieved through a computer program.

Computing device: general purpose device used to carry out a finite set of arithmetic or logical operations.

Current most pertinent video feed: a single video feed with the highest pertinence rank at a given moment in time.

End Viewer: person or individual who is viewing the remote interaction.

Graphical user interface: a type of user interface that allows users to interact with electronic devices.

High Bandwidth: a bandwidth identified as being above a pre-determined bandwidth threshold.

Local audience viewer: a viewer who is identified as being above a pre-determined bandwidth threshold.

Low Bandwidth: a bandwidth identified as being below a pre-determined bandwidth threshold.

Plurality of video feeds: more than a single video feed; at least two video feeds.

Performance criteria: a set of rules according to which the comprehension scores are calculated. Performance criteria may include the frequency with which the user changes his video feed selection, the amount of notes user takes, the amount of time the user is spending actively interacting with the software program, the amount of quiz questions the user answered correctly, etc.

Pertinence rank: a value associated with each video feed reflecting the current pertinence of that video feed. Pertinence rank may be a function of a number of variables including the percentage of the local audience viewers that have currently selected that video feed over other video feeds, and each user's selection may be weighted based on his comprehension score.

Real-time average comprehension score: this is an average of all comprehension scores of the live audience viewers (both local and remote). The real-time average comprehension score reflects the average engagement/performance of the class at any given point during the video broadcast.

Remote audience viewer: a viewer who is identified as being below a pre-determined bandwidth threshold.

Remote interaction: communication that occurs over a long distance or distributed network through video. This may include pre-recorded and live communication.

System administrator: a user who is granted access to more information and aspects of the software program than the end viewers. System administrator may be a course professor, a teaching assistance, a presenter, or another authorized third party.

Unique identifier: personal information which can be used to identify a specific individual or source.

Video Feed: video media delivered from a single source.

Video feed selection: the video feed that a local audience viewer has chosen to watch over other available video feeds.

What is claimed is:

1. A computer implemented method for an automated distributed learning broadcasting, comprising:
 receiving a plurality of video feeds for a single remote interaction to a computer-based server;
 receiving bandwidth information from an end viewer;
 determining whether the end viewer has a high bandwidth or a low bandwidth connection based upon pre-determined bandwidth criteria;
 issuing a unique identifier to the end viewer associated with the bandwidth information received from the end viewer, wherein the end viewer is identified as a local audience viewer with the high bandwidth or the end viewer is identified as a remote audience viewer with the low bandwidth;
 responsive to the end viewer identified as the local audience viewer, sending the plurality of video feeds to the local audience viewer, wherein a single video feed is selected from the plurality of video feeds by the local audience viewer;
 receiving an indication of the single video feed selection from a plurality of local audience viewers;
 determining a most selected single video feed responsive to the indication of the single video feed selection from the plurality of local audience viewers;
 responsive to the end viewer identified as the remote audience viewer, sending the most selected single video feed to the remote audience viewer; and
 updating the most selected single video feed responsive to a determination of a new most selected single video feed.

2. The method of claim 1 further comprising determining whether a pre-determined time limit has been reached before sending the new most selected video feed.

3. The method of claim 1 further comprising:
 determining whether the most selected video feed from the plurality of local audience viewers has been selected for a pre-determined length of time; and
 responsive to the most selected video feed from the plurality of local audience viewers being selected for the pre-determined period of time, changing the single video feed.

4. The method of claim 1 further comprising:
 recording a plurality of video feed selections; and
 associating the recordings of the plurality of video feed selections throughout the automated distributed learning broadcasting with a uniquely defined local audience viewer based upon the unique identifier.

5. A system for automated distributed learning broadcasting, comprising:
 a computer-based server operable to:
 receive a plurality of video feeds for a single remote interaction to a computer-based server;
 receive bandwidth information from an end viewer;
 determine whether the end viewer has a high bandwidth or a low bandwidth connection based upon pre-determined bandwidth criteria;
 issue a unique identifier to the end viewer associated with the bandwidth information from the end viewer, wherein the end viewer is identified as a local audience viewer with the high bandwidth or the end viewer is identified as a remote audience viewer with the low bandwidth;
 responsive to the end viewer identified as the local audience viewer, sending the plurality of video feeds to the local audience viewer, wherein a single video feed is selected from the plurality of video feeds by the local audience viewer;
 receive an indication of the single video feed selection from a plurality local audience viewers;
 determine a most selected single video feed responsive to the indication of the single video feed selection from a plurality of local audience viewers;
 responsive to the end viewer identified as the remote audience viewer, sending the most selected single video feed to the remote audience viewer;
 update the most selected single video feed responsive to a determination of a new most selected single video feed.

6. The system of claim 5, wherein the server is operable to:
 determine whether a pre-determined time limit has been reached before sending the new most selected video feed.

7. The system of claim 5, wherein the server is operable to:
 determine whether the most selected video feed from the plurality of local audience viewers has been selected for a pre-determined length of time; and
 responsive to the most selected video feed from the plurality of local audience viewers being selected for the pre-determined period of time, changing the single video feed.

8. The system of claim 5, wherein the server is operable to:
 record a plurality of video feed selections the automated distributed learning;
 associate the recordings of the plurality of video feed selections throughout the automated distributed learning with a uniquely defined local audience viewer based upon the unique identifier.

9. A non-transitory tangible computer-readable media having computer-executable instructions for performing a method by running a software program on a computer, the computer operating under an operating system, the method including issuing instructions from the software program to perform a series of steps comprising:
 receiving a plurality of video feeds for a single remote interaction to a computer-based server;
 receiving bandwidth information from an end viewer;
 determining whether the end viewer has a high bandwidth or a low bandwidth connection based upon pre-determined bandwidth criteria;
 classifying the end viewer as a local audience viewer responsive to the end viewer having the high bandwidth;
 classifying the end viewer as a remote audience viewer responsive to the end viewer having the low bandwidth;
 responsive to the end viewer identified as the local audience viewer, sending the plurality of video feeds to the local audience viewer;
 receiving from each local audience viewer a selection of a single video feed from the plurality of video feeds;
 calculating a pertinence rank for each of the plurality of video feeds based upon the video feed selections by the plurality of local audience viewers;
 determining a current most pertinent video feed, wherein the current most pertinent video feed is the single video feed with a highest pertinence rank;
 sending only the current most pertinent video feed to the remote audience viewer; and
 updating the current most pertinent video feed responsive to a determination that another video feed has acquired a higher pertinence rank than the current most pertinent video feed.

10. The media of claim 9, wherein the pertinence rank of each video feed is a function of a percentage of the local audience viewers selecting that video feed.

11. The media of claim 9 further comprising the step of determining a comprehension score for each local audience viewer based upon predetermined viewer performance criteria, wherein the pertinence rank is a function of the comprehension scores.

12. The media of claim 11, wherein the predetermined viewer performance criteria are selected from the group consisting of a frequency of changing the video feed selection, a number of correctly answered quiz questions, a number of characters entered as notes, a duration of inactivity, and combinations thereof.

13. The media of claim 9, further comprising:
calculating a real-time average comprehension score for the pluralities of local and remote audience viewers based upon predefined viewer performance criteria; and
providing the real-time average comprehension score to a system administrator.

14. The media of claim 9, further comprising the step of allocating a priority bandwidth to the current most pertinent video feed.

15. The media of claim 9, further comprising:
responsive to the current most pertinent video feed remaining non-updated for a period of time exceeding a predetermined threshold, discontinuing sending the current most pertinent video feed to the remote audience viewer;
determining a second video feed with the second highest pertinence rank; and
sending only the second video feed to the remote audience viewer.

* * * * *